(12) United States Patent
Waller et al.

(10) Patent No.: US 11,991,247 B1
(45) Date of Patent: May 21, 2024

(54) AUTOMATION OF GRANULAR OBJECT STORAGE SERVICE COST AND/OR USAGE DETERMINATION

(71) Applicants: Marquis Waller, Boulder, CO (US); Michael Lotz, Boulder, CO (US); Benjamin Beatty, Boulder, CO (US); Taylor Stock, Boulder, CO (US)

(72) Inventors: Marquis Waller, Boulder, CO (US); Michael Lotz, Boulder, CO (US); Benjamin Beatty, Boulder, CO (US); Taylor Stock, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/180,912

(22) Filed: Mar. 9, 2023

(51) Int. Cl.
*H04L 12/70* (2013.01)
*H04L 67/1097* (2022.01)

(52) U.S. Cl.
CPC .............. *H04L 67/1097* (2013.01)

(58) Field of Classification Search
CPC .................................................. H04L 67/1097
USPC .......................................................... 709/217
See application file for complete search history.

(56) References Cited

U.S. PATENT DOCUMENTS

| | | |
|---|---|---|
| 8,484,259 B1 | 7/2013 | Makkar et al. |
| 10,318,491 B1 | 6/2019 | Graham et al. |
| 11,216,309 B2 | 1/2022 | Piercey et al. |
| 11,474,733 B2 | 10/2022 | Ayzenberg et al. |
| 11,487,730 B2 | 11/2022 | Bhagwat et al. |
| 2013/0054536 A1* | 2/2013 | Sengupta ............ G06F 11/2094 707/654 |
| 2014/0215574 A1 | 7/2014 | Erb et al. |
| 2020/0007156 A1* | 1/2020 | Fenney ................... G06T 1/60 |
| 2020/0125582 A1* | 4/2020 | O'Shaughnessy .... G06F 16/245 |
| 2021/0034598 A1* | 2/2021 | Arye ..................... G06F 16/288 |
| 2021/0073222 A1* | 3/2021 | Kadiyala ............... G06F 16/215 |
| 2021/0176038 A1* | 6/2021 | Bortnikov ................. H04L 9/50 |
| 2021/0342086 A1* | 11/2021 | Chang ................... G06F 16/215 |
| 2022/0019554 A1* | 1/2022 | Trout .................... G06F 16/182 |

(Continued)

FOREIGN PATENT DOCUMENTS

CN 112887349 A 6/2021

OTHER PUBLICATIONS

Imran et al., "Searching in Cloud Object Storage by Using a Metadata Model", 8 pages, 2014.

*Primary Examiner* — Ario Etienne
*Assistant Examiner* — Elizabeth Kassa
(74) *Attorney, Agent, or Firm* — Jaffery Watson Mendonsa & Hamilton LLP (57) ABSTRACT

Systems and method for automated determination of granular object storage service metrics are provided. In one example, metadata regarding a subset of objects stored in one or more shared containers of an object storage service is retrieved. One or more meta properties (e.g., a storage tier with which the object is associated, a size of the object, an object type, a file type, user-defined tags, and a full path of the object, including, for example, information indicative of the application and the tenant) may be obtained for each object of the subset of objects. The subset of objects satisfy a set of one or more criteria involving the metadata and/or the meta properties. A total storage cost and/or a total size of the subset of objects is determined by aggregating a storage cost and/or a size of each object of the subset of objects.

20 Claims, 9 Drawing Sheets

(56) References Cited

U.S. PATENT DOCUMENTS

| | | | |
|---|---|---|---|
| 2022/0326867 A1* | 10/2022 | Thakkar | G06F 12/0253 |
| 2022/0405789 A1* | 12/2022 | Shah | G06F 21/6218 |
| 2023/0153010 A1* | 5/2023 | Kapadia | G06F 3/0652 |
| | | | 711/154 |
| 2023/0252041 A1* | 8/2023 | Slember | G06F 16/27 |
| | | | 707/620 |

* cited by examiner

14 — 501
1000 — 502
false — 503

510

511 — Application A/
512 — 2023-01-31T23:37:27
513 — "d41d8cd98f00b204e9800998ecf8427e"
514 — 0
515 — STANDARD Application A/Tenant 1/
2023-01-31T23:38:29
"d41d8cd98f00b204e9800998ecf8427e"
0
STANDARD Application A/Tenant 1/ImageFile.webp
2023-02-01T18:01:20
"9019cfe76e3e23121d921e1c7e9620c7"
266014
STANDARD Application A/Tenant 2/
2023-01-31T23:38:35
"d41d8cd98f00b204e9800998ecf8427e"
0
STANDARD Application A/Tenant 2/isf_picture.jpg
2023-02-01T18:06:03
"149c0efbf512de99852cc44ab06c3674"
302539
STANDARD Application A/Tenant 3/
2023-01-31T23:38:42
"d41d8cd98f00b204e9800998ecf8427e"
0
STANDARD Application A/Tenant 3/Test.txt
2023-02-01T18:12:18
"e27d8d1ff30c21748de39c17f61ec802-3"
35581984
STANDARD Application B/
2023-01-31T23:37:34
"d41d8cd98f00b204e9800998ecf8427e"
0
STANDARD Application B/Tenant 1/
2023-01-31T23:39:06
"d41d8cd98f00b204e9800998ecf8427e"
0
STANDARD Application B/Tenant 1/output.json
2023-02-01T18:16:17
"430dcc35e68bd971463bcfaa8bd245d9"
103
STANDARD Application B/Tenant 2/
2023-01-31T23:39:12
"d41d8cd98f00b204e9800998ecf8427e"
0
STANDARD Application B/Tenant 2/s3Dynamo.png
2023-02-01T18:17:56
"18def0564d4c4ed3386bba6d9caa841c"
33706
STANDARD Application B/Tenant 3/
2023-01-31T23:39:17
"d41d8cd98f00b204e9800998ecf8427e"
0
STANDARD Application B/Tenant 3/Profile.json
2023-02-01T18:21:46
"1cbe93e23ff2e4b3cc256a943f053446-4"
52809686
STANDARD

*FIG. 5*

```
"Application A": {
    "attributes": {
        "size": 36150537,
        "objectCount": 7,
        "cost": "$0.000831462351",
        "lastModified": "2023-01-31T23:37:27",
        "fileType": "",
        "isDirectory": true
    },
    "Tenant 1": {
        "attributes": {
            "size": 266014,
            "objectCount": 2,
            "cost": "$0.0000061183220000000005",
            "lastModified": "2023-01-31T23:38:29",
            "fileType": "",
            "isDirectory": true
        },
        "ImageFile.webp": {
            "attributes": {
                "size": 266014,
                "objectCount": 1,
                "cost": "$0.0000061183220000000005",
                "lastModified": "2023-02-01T18:01:20",
                "fileType": "webp",
                "isDirectory": false
            }
        },
    },
```

```
"Tenant 2": {
    "attributes": {
        "size": 302539,
        "objectCount": 2,
        "cost": "$0.000006958396999999994",
        "lastModified": "2023-01-31T23:38:35",
        "fileType": "",
        "isDirectory": true
    },
    "sf_picture.jpg": {
        "attributes": {
            "size": 302539,
            "objectCount": 1,
            "cost": "$0.000006958396999999994",
            "lastModified": "2023-02-01T18:06:03",
            "fileType": "jpg",
            "isDirectory": false
        }
    },
},
```

```
"Tenant 3": {
    "attributes": {
        "size": 35581984,
        "objectCount": 2,
        "cost": "$0.00081838563199999999",
        "lastModified": "2023-01-31T23:38:42",
        "fileType": "",
        "isDirectory": true
    },
    "Test.txt": {
        "attributes": {
            "size": 35581984,
            "objectCount": 1,
            "cost": "$0.00081838563199999999",
            "lastModified": "2023-02-01T18:12:18",
            "fileType": "txt",
            "isDirectory": false
        }
    },
},
```

"Application B": {
    ".attributes": {
        "size": 52843495,
        "objectCount": 7,
        "cost": "$0.0012154003085",
        "lastModified": "2023-01-31T23:37:34",
        "fileType": "",
        "isDirectory": true
    },
    "Tenant 1": {
        ".attributes": {
            "size": 103,
            "objectCount": 2,
            "cost": "$2.369e-9",
            "lastModified": "2023-01-31T23:39:06",
            "fileType": "",
            "isDirectory": true
        },
        "output.json": {
            ".attributes": {
                "size": 103,
                "objectCount": 1,
                "cost": "$2.369e-9",
                "lastModified": "2023-02-01T18:16:17",
                "fileType": "json",
                "isDirectory": false
            }
        },
    },
```

```
"Tenant 2": {
    ".attributes": {
        "size": 33706,
        "objectCount": 2,
        "cost": "$7.75238e-7",
        "lastModified": "2023-01-31T23:39:12",
        "fileType": "",
        "isDirectory": true
    },
    "Dynamo.png": {
        ".attributes": {
            "size": 33706,
            "objectCount": 1,
            "cost": "$7.75238e-7",
            "lastModified": "2023-02-01T18:17:56",
            "fileType": "png",
            "isDirectory": false
        }
    },
},
```

```
"Tenant 3": {
    ".attributes": {
        "size": 52809686,
        "objectCount": 2,
        "cost": "$0.0012146222778",
        "lastModified": "2023-01-31T23:39:17",
        "fileType": "",
        "isDirectory": true
    },
    "Profile.json": {
        ".attributes": {
            "size": 52809686,
            "objectCount": 1,
            "cost": "$0.0012146222778",
            "lastModified": "2023-02-01T18:21:46",
            "fileType": "json",
            "isDirectory": false
        }
    },
},
```

AUTOMATION OF GRANULAR OBJECT STORAGE SERVICE COST AND/OR USAGE DETERMINATION

FIELD

Various embodiments of the present disclosure generally relate to use of an object storage service as part of a multi-tenant Software-as-a-Service (SaaS) offering. More particularly, embodiments relate to an automated approach for determining granular cost and/or usage information for an object storage service, for example, to facilitate cost allocation among customers of a SaaS provider.

BACKGROUND

Cloud-based SaaS entities that provide access to one or more applications or services hosted by a cloud provider (e.g., Amazon, Google, Microsoft, or IBM) may store files on behalf of their customers (tenants) within an object storage service (e.g., a Simple Storage Service (S3)-compatible object storage service) provided by the cloud provider. The SaaS provider typically organizes the structure of the storage of data in a manner that is most suitable for use by the applications, which may result in the sharing of various object containers (e.g., S3 buckets) among multiple applications and/or multiple customers.

In general, each piece of data (which may be referred to herein as an object) that is stored within an object storage service has a storage cost based on the storage type (or storage tier) and the size of the object. In the context of the Amazon Web Services (AWS) S3 object storage service, AWS offers tags on S3 buckets sufficient to allow a determination of costs at a bucket level (i.e., storage costs for all objects stored within a particular bucket); however, AWS does not provide a mechanism for more granular cost allocation.

SUMMARY

Systems and methods are described for automated determination of granular object storage service cost and/or usage. In one embodiment, a method is disclosed. The method includes retrieving metadata regarding a subset of objects of multiple objects stored in one or more containers of an object storage service hosted by a cloud-based platform. The subset of objects satisfy a set of one or more criteria. The one or more containers are shared by multiple customers of a Software-as-a-Service (SaaS) provider and/or multiple applications offered by the SaaS provider. The method further includes determining one or more of a total storage cost and a total size of the subset of objects by aggregating one or more of a storage cost and a size of each object of the subset of objects.

Other features of embodiments of the present disclosure will be apparent from accompanying drawings and detailed description that follows.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Systems and method are described for automated determination of granular object storage service cost and/or usage. As noted above, a SaaS provider may store objects (e.g., files) on behalf of its customers within an object storage service (e.g., AWS S3). Notably, the data is not typically stored in a way to help with the determination of storage cost and/or storage usage. Rather, the data is generally stored within the object storage service in a manner that is most suitable for the given application. As such, objects associated with different applications and/or different customers of a SaaS provider may be comingled or mixed within a given object container (e.g., a given S3 bucket) of the object storage service. While a cloud provider (e.g., AWS) may provide a mechanism for determining total storage costs and/or storage usage at a bucket level, such high-level information is not helpful to gaining an understanding of storage costs and/or storage usage at a more granular level. As a result, it is difficult for the SaaS provider to allocate storage costs among its customers or determine how much data is being stored based on various criteria. Similarly, a user of a given application may have difficulties understanding their total storage usage and/or storage usage for various business purposes, geographical regions, business units, or offices. For example, at present there is no automated means exposed by cloud providers to determine how much each customer is costing based on objects they have stored within an object storage service, how much storage is being used for various types of data, how much data is being stored in various storage tiers, and how much data is being stored for objects having certain user-defined tags.

As such, embodiments described herein seek to facilitate automated and granular determination of object storage service cost and/or usage based on a query specifying a set of one or more criteria. As described further below, in one embodiment, the proposed solution is able to allow object metadata to be maintained in a data store separate and apart from the structure of the data maintained for the benefit of the application at issue. In this manner, the applications may store object data and/or metadata in a way that is most efficient for their purposes and are not forced to compromise their effectiveness by implementing a storage structure that has limited applicability, for example, in connection with determining cost and/or usage. In one embodiment, a program or script may be executed by a computing device, a compute instance, or a function (e.g., a lambda function) of a serverless compute service (e.g., AWS Lambda) to scan through one or more S3 buckets and evaluate each object. The program/script may read the metadata (e.g., (i) meta properties, including, for example, the storage tier with which the object is associated, the size of the object, the object type, the file type, etc., (ii) user-defined tags, and (iii) the full path of the objects, including, for example, information indicative of the application and the tenant) for the objects within the one or more S3 buckets. With this information, a total may be calculated for all objects matching a specified set of one or more criteria from the meta properties, the tags and/or the path and return a cost total for all objects matching the specified criteria. The one or more criteria may be represented in the form of one or more conditional expressions involving various combinations of the meta properties, the tags, and/or the path. The availability of such granular object metadata allows slicing and dicing of the metadata as desired to determine, for example, how much each tenant and/or application is costing, how much various types of data are costing as well as usage tiers being used and how much data is stored based on the one or more criteria. With this information a variety of actions can then be taken. For example, the SaaS provider or the user of the application may use the gathered information to determine how to reduce cost, the SaaS provider may charge customers more if they have a specific predetermined usage characteristics, and/or customers may internally allocate costs among business units, offices, business functions, or otherwise based on the one or more criteria involving user-defined tags. For example, some usages may be associated with higher/lower costs, such as usage during certain peak hours, more frequent access than some predefined frequency or number, the duration for which the cloud service will store the data, guarantees of resource priorities (e.g., you have priority access, are de-rated, or locked out) or lack thereof, or any of a variety of other usage patterns or parameters that are typical within a cloud storage environment.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "function," "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

As used herein terms like "cloud," "cloud environment," "cloud platform" and the like broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS).

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
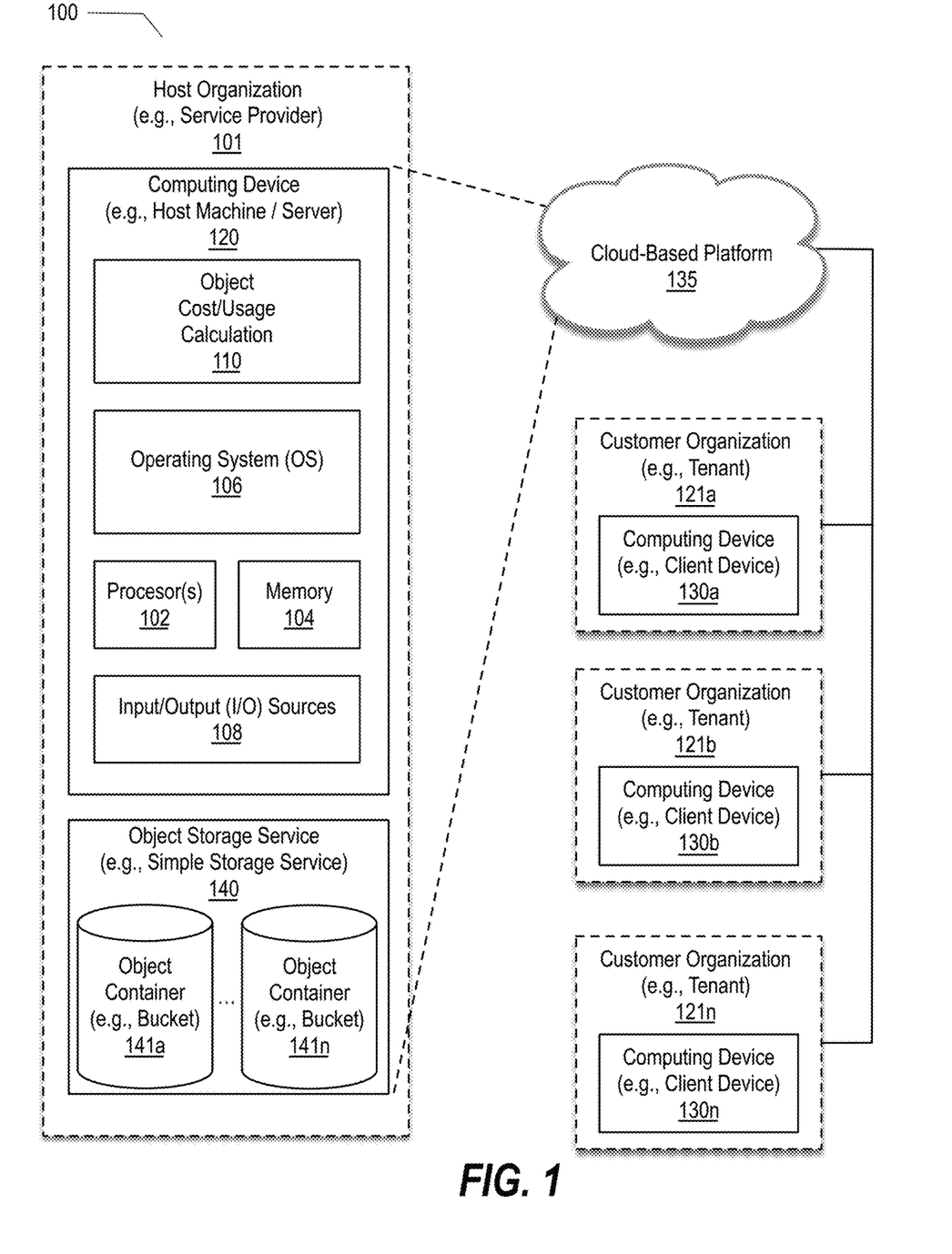
FIG. 1 is a block diagram of a system employing an object cost/usage calculation mechanism according to an embodiment of the present disclosure.

FIG. 1 is a block diagram of a system 100 employing an object cost/usage calculation mechanism according to an embodiment of the present disclosure. In the context of the present example, a host organization 101 (e.g., a service provider) may make use of a software distribution model (e.g., SaaS) in which a cloud provider operating a cloud-based platform 135 hosts one or more applications (not shown) and facilitates them being made available by the host organization 101 to end users (e.g., customer organizations or tenants 121*a-n*). Non-limiting examples of the cloud-based platform 135 include Amazon Web Services (AWS), Google Cloud Platform (GCP), Microsoft Azure, and IBM Cloud platform.

In one embodiment, a computing device 120 and an object storage service 140 within the cloud-based platform 135 may be used by an object cost/usage calculation mechanism 110. The computing device 120 may be a host server computer serving as a host machine for employing the object cost/usage calculation mechanism to facilitate granular determination of storage cost and/or storage size of objects stored in the object storage service 140. The objects stored in the object storage service may represent various types of files (e.g., containing image data, print data, functional data, business intelligence data, or other types of data) or data within a data lakehouse. The objects stored in the object storage service may represent inputs to and/or outputs of the applications. In one embodiment, the object cost/usage calculation mechanism 110 may be implemented in the form of a lambda function executed by a compute service (e.g., AWS Lambda) that performs the administration of the underlying compute resources. Alternatively, the object cost/usage calculation mechanism 110 may be implemented as one or more microservices within a container orchestration platform operable within the cloud-based platform 135.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130*a*-130*n*, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may operate as a SaaS provider by virtue of computing device 120 being communicably interfaced with client devices 130*a*-*n* of respective customer organizations 121*a*-*n* through the Internet (not shown). For the benefit of customer organizations 121*a*-*n*, host organization 101 may provide secure data storage safe from unauthorized access, corruption, hacking, or theft on behalf of the customer organizations 121*a*-*n*. Client devices 130*a*-*n* may include (without limitation) customer organization-based server computers, desktop computers, laptop computers, mobile computing devices, such as smartphones, tablet computers, personal digital assistants, etc.

In one embodiment, as part of the utilization of the applications provided as a service by the host organization 110, the illustrated object containers 141*a*-*n* (e.g., buckets) may store (without limitation) files (e.g., representing configuration data, input data, and/or output data) of the customer organizations 121*a*-*n* that are used by or created by the applications. In some embodiments, host organization 101 receives input and other requests from one or more of the customer organizations 121*a*-*n* as part of the usage of the applications by the customer organizations 121*a*-*n*. Depending on the applications at issue, the input and other requests may represent, for example, incoming print job and/or document processing requests.

In one embodiment, each customer organization 121*a*-*n* is an entity selected from a group consisting of a separate and distinct remote organization, an organizational group within host organization 101, a business partner of host organization 101, a customer organization 121*a*-*n* that subscribes to cloud computing services provided by host organization 101, etc. In a further embodiment, customer organizations 121*a*-*n* may represent printing entities that implement high-speed production printers for volume printing on behalf of the host organization 101.

Figure 2:
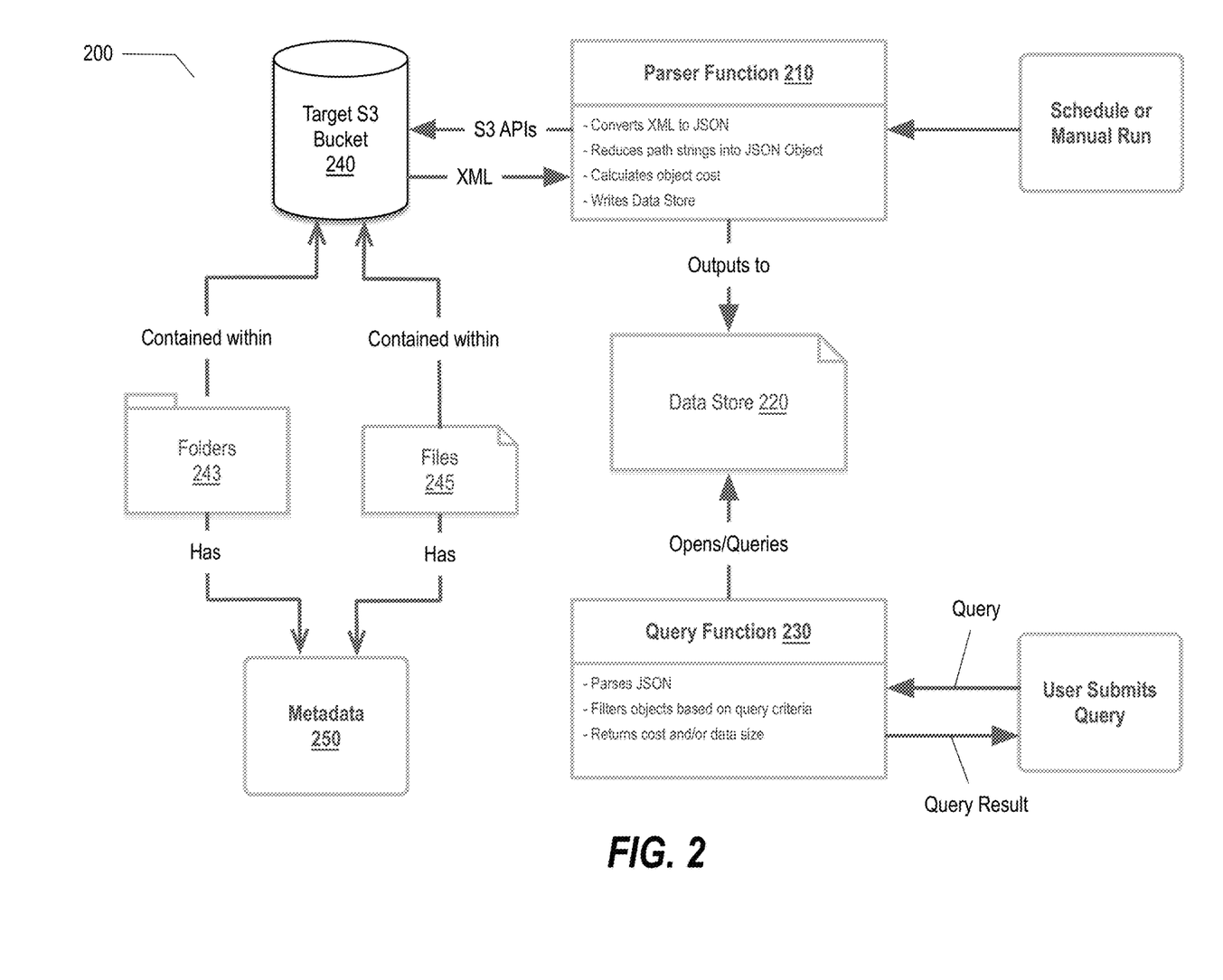
FIG. 2 is a Uniform Modeling Language (UML) diagram representing various aspects of an object cost/usage calculation mechanism according to an embodiment of the present disclosure.

FIG. 2 is a Uniform Modeling Language (UML) diagram 200 representing various aspects of an object cost/usage calculation mechanism according to an embodiment of the present disclosure. A SaaS provider (e.g., host organization 101) may store files (e.g., files 245) in the form of objects on behalf of its customers (e.g., customer organization 121*a*-*n*). The files may be stored within an S3 bucket (e.g., target S3 bucket 240, which may be analogous to one of object containers 141*a*-*n*). The files may be organized within a hierarchical directory structure including folders 243, which may also be represented as objects. Each folder and file may have associated metadata 250 describing information about the folder or the file, as the case may be. In various examples described herein, the metadata 250 may include, among other information, one or more of (i) meta properties, including, for example, the storage tier (e.g., standard or glacier) with which the object is associated, the size of the object, the object type, the file extension, etc., (ii) user-defined tags, and (iii) the full path of the objects, including, for example, information indicative of the location of the object within the hierarchical directory structure.

While the files stored by the SaaS provider on behalf of their customers (e.g., customer organizations 121*a*-*n*) may represent any type of data (e.g., text, image, databases, etc.), in some embodiments, the SaaS provider may offer applications and/or services to print entities (or print shops) and provide backup storage (e.g., for auditing purposes and/or disaster recovery) for jobs that are to be printed. In addition, the SaaS provider may implement business intelligence (BI) tools to illustrate trends that can be used to assist the print shops in making critical business choices based on past job processing. Print data may be stored in various formats, for example, in the format received from devices 130*a*-*n* and/or in a restructured format. Non-limiting examples of print data formats include Advanced Function Presentation (AFP), portable document format (PDF), page description language (PDL), job definition format (JDF), JavaScript Object Notation (JSON), comma-separated values (CSV), parquet, binary, etc.

As noted above, the SaaS provider may organize the structure of the storage of data within one or more S3 buckets of an object storage service in a manner that is most suitable for use by the applications utilized by their customers. As a result, a given S3 bucket may be shared among multiple applications and/or multiple customers. For example, as described with reference to the simple bucket illustrated in FIG. 4, folders for individual tenants (customers) may contain files of the individual tenants and may be organized within folders for individual applications, thereby resulting in the given S3 bucket containing objects associated with multiple applications and/or multiple customers. While an object storage service (e.g., AWS S3) may tag or otherwise label S3 buckets with information that allows a determination of a total storage cost for a given S3 bucket in its entirety, for purposes of facilitating cost allocation among its customers, among other things, the SaaS provider may have a need to calculate storage costs at a more granular level based on various criteria specified in terms of the metadata 250. For example, the SaaS provider may want to know what the storage costs are in the aggregate for a group of files that are stored on behalf of a particular customer, associated with a particular application, containing a particular type of data, etc.

In the context of the present example, a non-limiting example of object cost/usage calculation mechanism 110 is shown implemented as two separate and independent functions (e.g., a parser function 210 and a query function 230).

In one embodiment, the functions may be executed by a computing device (e.g., host machine/server 120), a compute instance (e.g., a virtual machine or container), or a function (e.g., a lambda function) of a serverless compute service (e.g., AWS Lambda).

Figure 4:
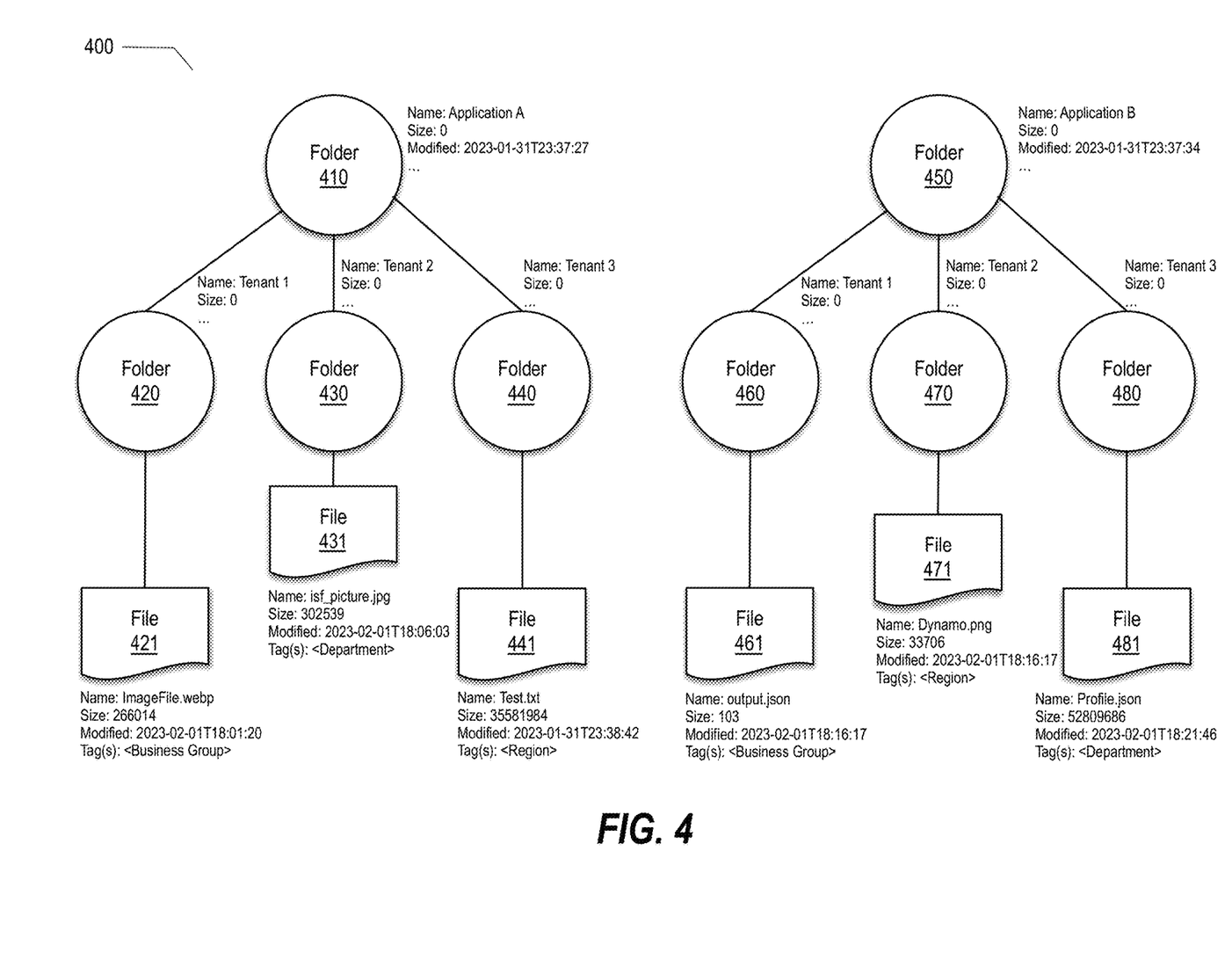
FIG. 4 conceptually illustrates example contents of a simple object container.

The parser function 210 may be responsible for making use of one or more appropriate application programming interface (API) calls (e.g., S3 API calls) to retrieve metadata associated with objects of a target object container (e.g., target S3 bucket 240). As a non-limiting example, the parser function 210 may obtain metadata for all or a subset of objects stored within a given S3 bucket using an API call (e.g., ListObjects) that returns a list of objects. An example of extensible markup language (XML) data that may be returned by such an API call for the simple bucket illustrated in FIG. 4 is described with reference to FIG. 5.

In one embodiment, the parser function 210 may be run periodically in accordance with a predefined or configurable schedule (e.g., once per 24 hours). The parser function 210 may convert a source data format returned by the API call to a desired data format. For example, the parser function 210 may convert a markup language and file format for storing, transmitting, and reconstructing arbitrary data (e.g., XML) to a lightweight data-interchange format (e.g., JavaScript Object Notation (JSON)). In one embodiment, as the path strings for each object returned by the API call are reduced to form a JSON object, the object storage cost may be calculated and included within the JSON object for each object. The parser function 210 may persist JSON objects within an intermediate data store (e.g., data store 220). The intermediate data store may be a file or a NoSQL database (e.g., Amazon DynamoDB or MongoDB) that allows for storage of JSON objects. In one embodiment, population of the intermediate data store by the parser function 210 facilitates subsequent querying of the object metadata by the query function 230 based on a set of criteria, for example, to allow, among other things, storage cost to be allocated among customers or determined for various groupings of files. A non-limiting example of obtaining and parsing object metadata is described further below with reference to FIG. 3.

In one embodiment, usage of the intermediate data store allows queries to be performed independent from the retrieval and parsing performed by the parser function 210, thereby reducing latency associated with responding to queries. Use of the intermediate data store also allows the object metadata to be stored in a format different from the manner in which the SaaS provider or the application structures the storage of objects within the target S3 bucket 240. In this manner, the object metadata data may be maintained separately to allow storage and/or usage tracking to be performed in a flexible and efficient manner by defining appropriate groupings of files based on criteria defined in terms of various aspects of the metadata 250. Furthermore, maintaining historical data over time allows periodic snapshots of the object metadata to be evaluated, for example, to facilitate monthly invoicing.

Turning now to the query function 230, it may be responsible for running queries received from a user (e.g., an administrative user of the SaaS provider) against a data lakehouse or a data store (e.g., data store 200) maintained separately from the target S3 bucket 240. The processing performed by the query function 230 may include parsing JSON objects persisted to the data store by the parser function 210 and filtering the object metadata based on the query criteria. Depending upon the particular implementation, the results of a given query, specifying a set of one or more criteria from meta properties, tags and/or the full object path, may include a storage cost total and/or a storage size (storage usage) total for all objects matching the specified criteria. A non-limiting example of querying object metadata is described further below with reference to FIG. 7.

While for simplicity only one target object container is shown, it is to be appreciated the parser function 210 may retrieve and parse object metadata for more than one object container. For example, the manual or periodic scheduled run of the parser function 210 may include a parameter identifying the specific object containers to be processed.

It is also to be appreciated, while various examples described herein assume the output of the parser function 210 is a JSON object, this is simply one of many potential output formats. Although storing the output of the parser function 210 in JSON facilitates subsequent querying performed by the query function 230, in alternative embodiments, the output of the parser function 210 may be stored within an XML file. Similarly, while the use of a data store (e.g., data store 220) as a separate data store for object metadata is beneficial for efficient query processing, there may be no intermediate data store or the intermediate data store may instead be in the form of a flat table of values that may be stored in a database within the target S3 bucket 240. As yet another alternative, the scanning and categorization may be applied to data for a data lake based on tenant, application, etc.

While in the context of the present example, obtaining and parsing object metadata from an object storage service and handling a query relating to the object metadata are shown as being performed separately and independently, which has various advantages (e.g., in terms of reduced latency), it is to be appreciated the retrieval and parsing of object metadata may alternatively be performed in-line with query processing. That is, parsing object metadata from the object storage and processing of a query may be performed serially. For example, after receipt of a query, a manual run of the parser function 210 could be performed followed by performance of the query function 230 on the output of the parser function 210.

Figure 3:
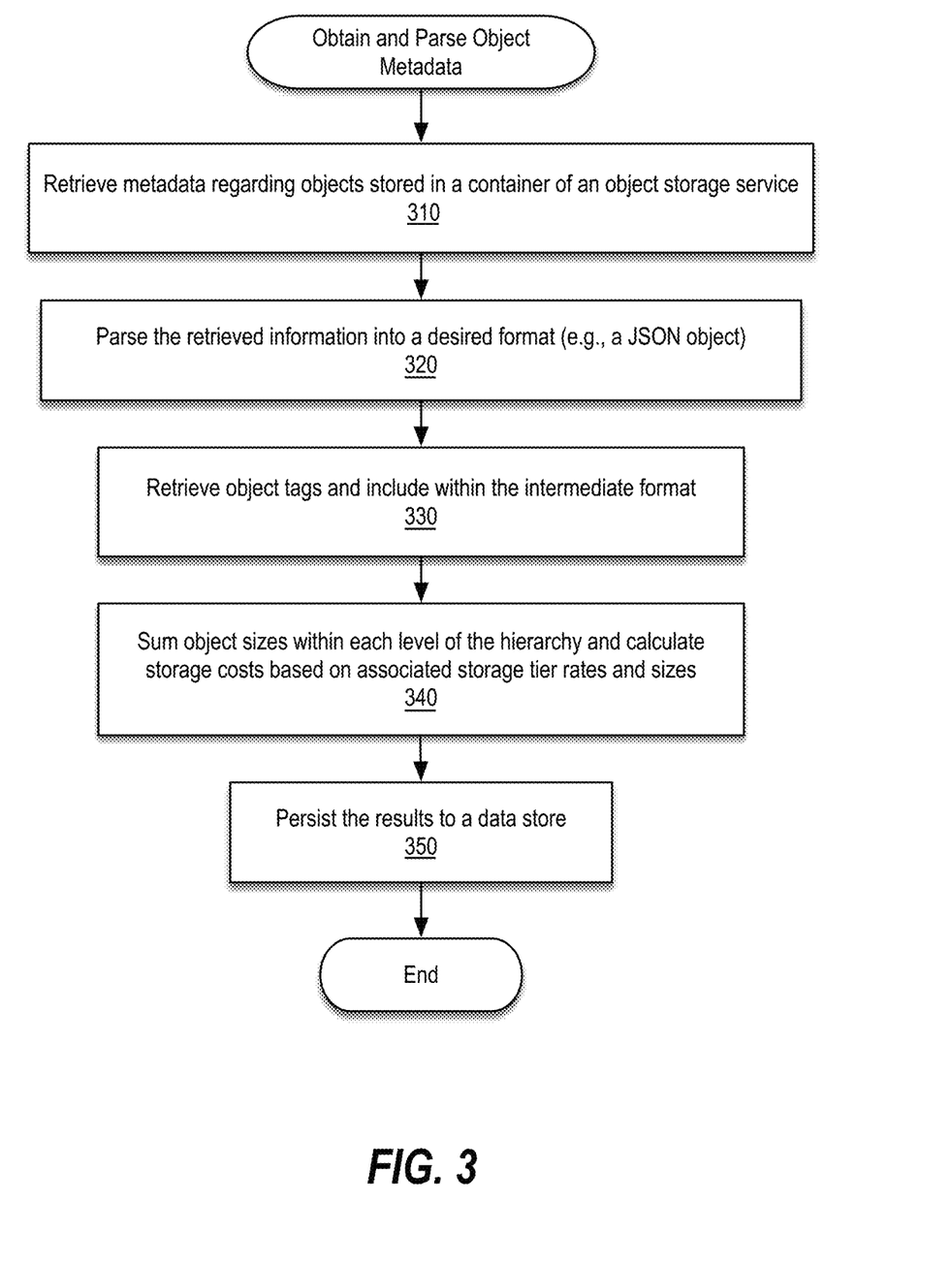
FIG. 3 is a flow diagram illustrating a set of operations for obtaining and parsing object metadata in accordance with an embodiment of the present disclosure.

FIG. 3 is a flow diagram illustrating a set of operations for obtaining and parsing object metadata in accordance with an embodiment of the present disclosure. The processing described with respect to FIG. 3 may be performed by an object cost/usage calculation mechanism (e.g., object cost/usage calculation mechanism 110). In one embodiment, the processing is performed by a parser function (e.g., parser function 210) and may be trigged manually or by run periodically based on a predefined or configurable schedule. Depending on the particular implementation, the processing may be performed by processing logic that may comprise hardware (e.g., circuitry, dedicated logic, programmable logic, etc.), software (such as instructions run on a processing device), or a combination thereof. For brevity and clarity in presentation, the process is illustrated in linear sequences; however, it is contemplated that any number of the processing blocks can be performed in parallel, asynchronously, or in different orders. For brevity, clarity, and ease of understanding, many of the details discussed with reference to FIGS. 1-2 are not discussed or repeated here.

At block 310, metadata (e.g., metadata 250) regarding objects (e.g., files 245 and folders 243) stored in a container (e.g., target S3 bucket 240) of an object storage service are retrieved. Assuming the object storage service is an S3-compatible object storage service, the ListObject API method may be used for this purpose.

At block 320, the retrieved information is parsed into a desired format. For example, the object storage service API may return the list of objects in the container in a first format (e.g., XML) and may be converted into a second format (e.g., JSON). In one embodiment, the object keys may be extracted from the first format and placed into an array. The array may then be looped through with a reducer function to build a JSON object with the path of each key or the object may be added to an existing JSON tree.

As will be appreciated by those skilled in the art, some object storage systems have a limit on the number of objects for which metadata is returned at a time. For example, the AWS S3 ListObject API method returns metadata for a maximum of 1,000 objects per call. If more than one call to the list API is needed, blocks 310 and 320 may be repeated until the metadata for all objects has been retrieved and parsed into the desired format.

At block 330, object tags may be retrieved and included within the JSON object. Such object tags may represent user-defined tags previously manually added to folders (e.g., folders 243) and/or files (files 245) by respective customers (e.g., customers 121a-n), for example, to facilitate understanding their total storage usage and/or storage usage for various purposes, within particular regions, and/or by particular business units or offices. Assuming the object storage service is an S3-compatible object storage service, the GetObjectTagging API method may be used for this purpose. For example, for each object, the GetObject Tagging API method may be invoked to obtain the tag-set of the object.

At block 340, within each level of the hierarchy the object sizes may be summed and a corresponding storage cost may be calculated based on the associated storage tier rates and sizes. In one embodiment, the storage cost may represent a normalized cost for a given period of time (e.g., 24 hours).

At block 350, the results (e.g., the populated JSON object) may be persisted to a data store (e.g., data store 220). For example, the JSON object may be stored within a JSON file or within a NoSQL database.

FIG. 4 conceptually illustrates example contents of a simple object container 400. The object container 400 may be analogous to target S3 bucket 240. In the context of the present example, it is assumed the structure of the storage of data is organized in a hierarchical manner with top-level folders (e.g., folders 410 and 450) corresponding to each application offered by a SaaS provider (e.g., host organization 101) and containing sub-folders (e.g., folders 420-440 and folders 460-480) corresponding to each customer that makes use of the particular application.

In this simplified example, intended solely to provide a non-limiting concrete example, object container 400 is shown including a directory structure including two hierarchies of folders (e.g., folders 410-440 and folders 450-480). Folder 410 represents a top-level folder corresponding to a first application (e.g., Application A) and including folders 420, 430, and 440, representing sub-folders corresponding to respective customers/tenants (e.g., Tenant 1, Tenant 2, and Tenant 3). Each sub-folder includes any files associated with the particular application that have been stored within an object storage service by the particular customer/tenant, the application, and/or by the SaaS provider on behalf of the particular customer/tenant. In this example, file 421 is stored within object container 400 on behalf of Tenant 1, file 431 is stored within object container 400 on behalf of Tenant 2, and file 441 is stored within object container 400 on behalf of Tenant 3

Similarly, folder 450 represents a top-level folder corresponding to a second application (e.g., Application B) and including folders 460, 470, and 480, representing sub-folders corresponding to respective customers/tenants (e.g., Tenant 1, Tenant 2, and Tenant 3). As above, each sub-folder includes any files associated with the particular application that have been stored within an object storage service by the particular customer/tenant, the application, and/or by the SaaS provider on behalf of the particular customer/tenant. In this example, file 461 is stored within object container 400 on behalf of Tenant 1, file 471 is stored within object container 400 on behalf of Tenant 2, and file 481 is stored within object container 400 on behalf of Tenant 3.

Figure 5:
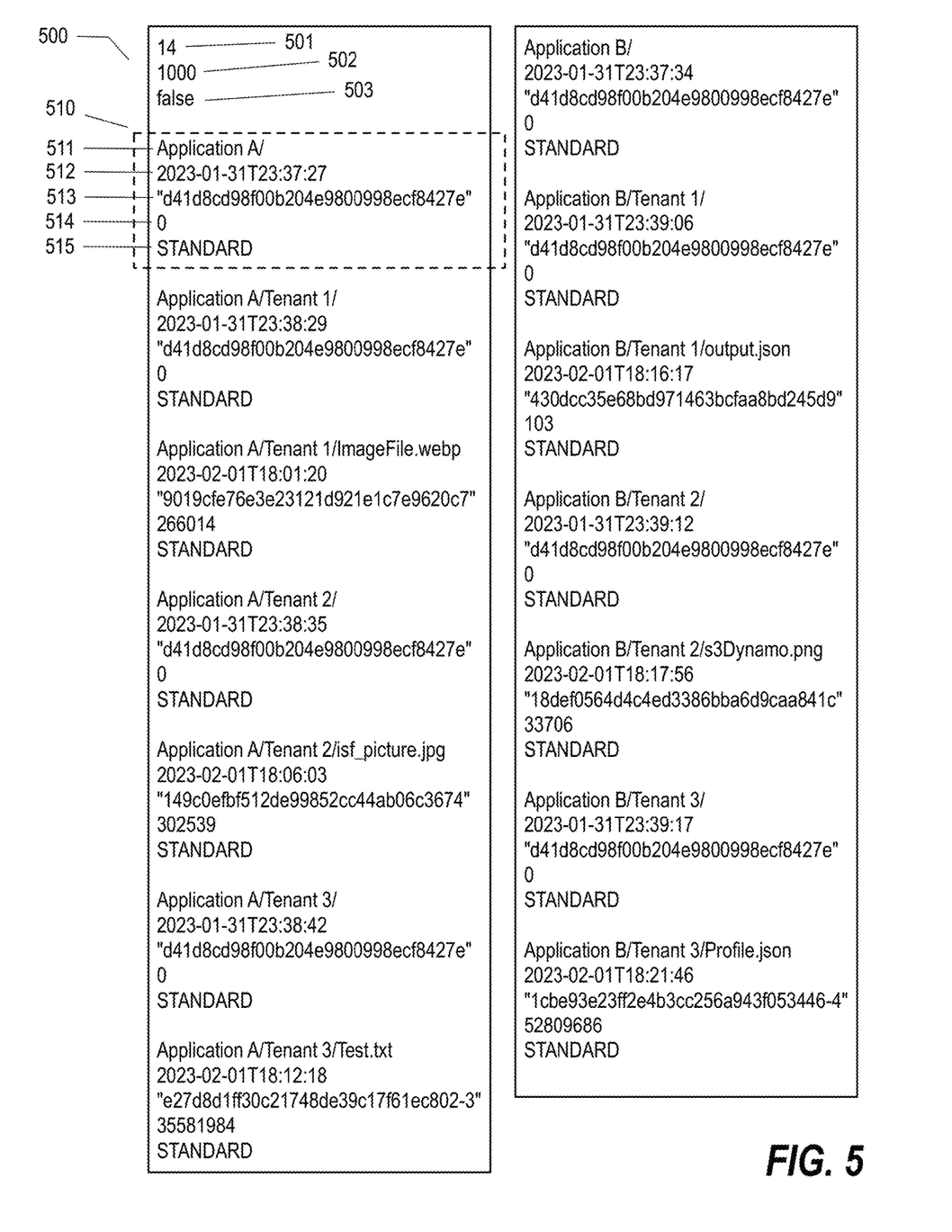
FIG. 5 illustrates an example of object metadata returned by an object storage service for the object container of FIG. 4.

FIG. 5 illustrates an example of object metadata 500 returned by an object storage service for the object container of FIG. 4. The object metadata 500 may represent XML data returned by an object storage service API call (e.g., ListObjects) that returns a list of objects within an object container (e.g., target S3 bucket 240). In the context of the present example, the object metadata 500 includes a total number of objects 501 in the object container, the maximum number of objects 502 returned by a single API call, a token 503 indicating whether there is a next page of objects, and metadata for each object (e.g., object 510).

In this example, object 510 corresponds to folder 410 and includes a full path 511 for the object, a modified timestamp 512, an Etag 513, a storage size 514 of the object in bytes, and an indication of the storage tier 515 in which the object is stored.

Figure 6A:
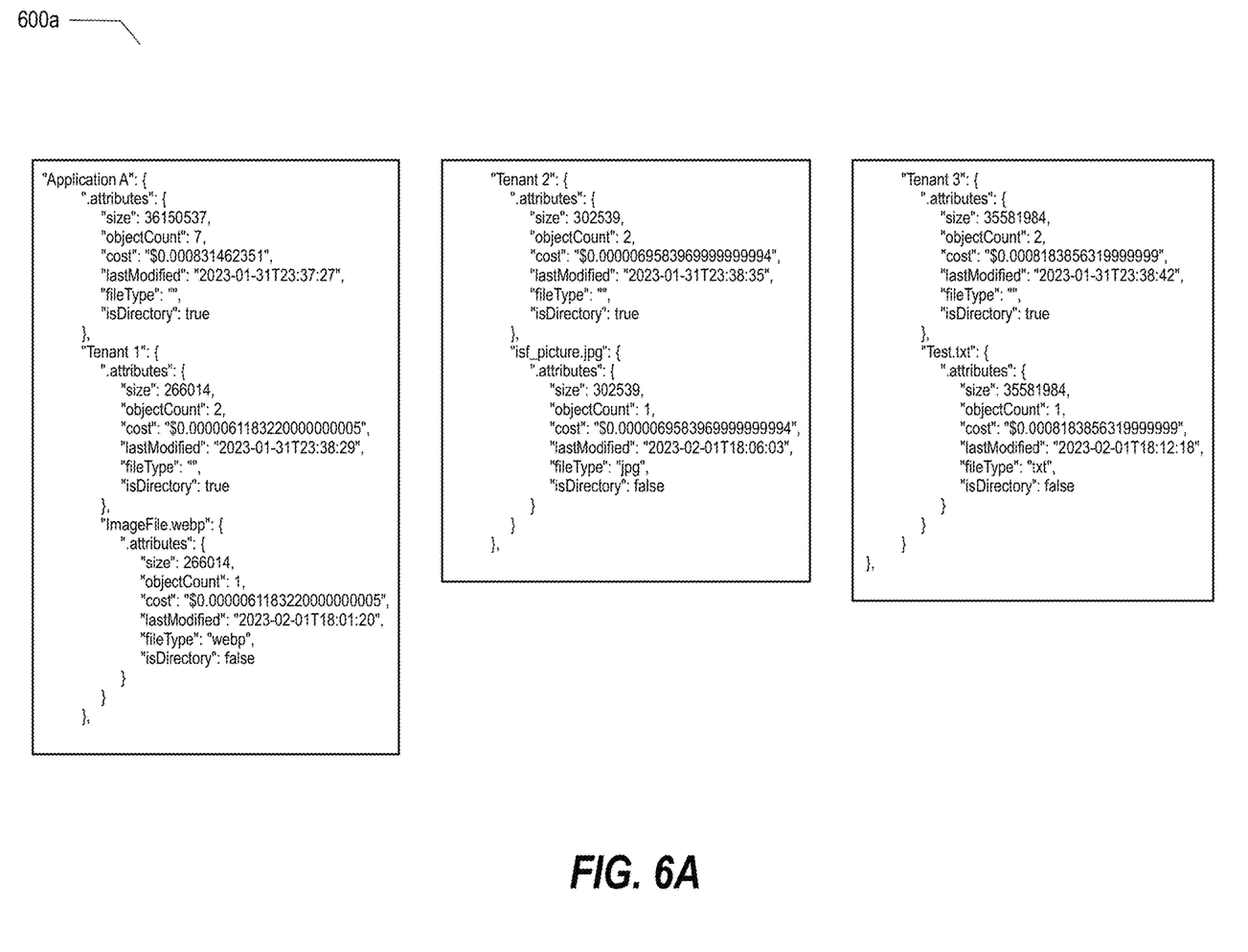
FIG. 6A illustrates an example of a first portion of a JSON object into which the object metadata of FIG. 5 may be transformed according to an embodiment of the present disclosure.
Figure 6B:
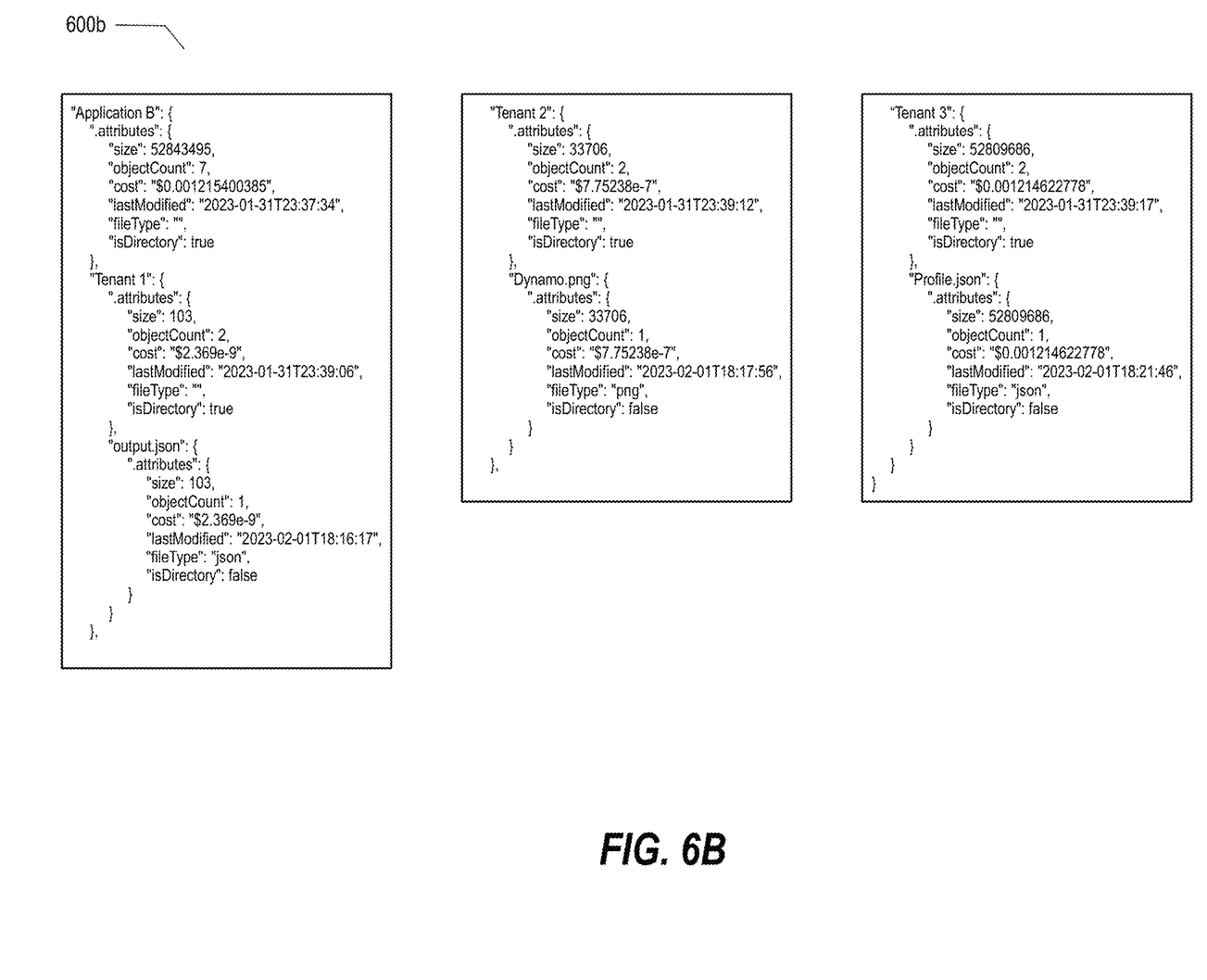
FIG. 6B illustrates an example of a second portion of a JSON object into which the object metadata of FIG. 5 may be transformed according to an embodiment of the present disclosure.

Collectively, FIGS. 6A-B represent a JSON object into which the object metadata of FIG. 5 may be transformed according to an embodiment of the present disclosure. FIG. 6A illustrates an example of a first portion 600a of the JSON object. In the context of the present example, the portion of object metadata 500 relating to objects associated with Application A (e.g., the directory structure including folders 410-440 and files 421, 431, and 441) has been used to build the first portion 600a of the JSON object. As can be seen in this example, a set of attributes (e.g., an aggregated size, an object count, a cost, a modified timestamp, a file type, and a directory flag) is populated for each level of the hierarchy.

FIG. 6B illustrates an example of a second portion 600b of the JSON object. In the context of the present example, the portion of object metadata 500 relating to objects associated with Application B (e.g., the directory structure including folders 450-480 and files 461, 471, and 481) has been used to build the second portion 600b of the JSON object. As above, a set of attributes (e.g., an aggregated size, an object count, a cost, a modified timestamp, a file type, and a directory flag) is populated for each level of the hierarchy.

Figure 7:
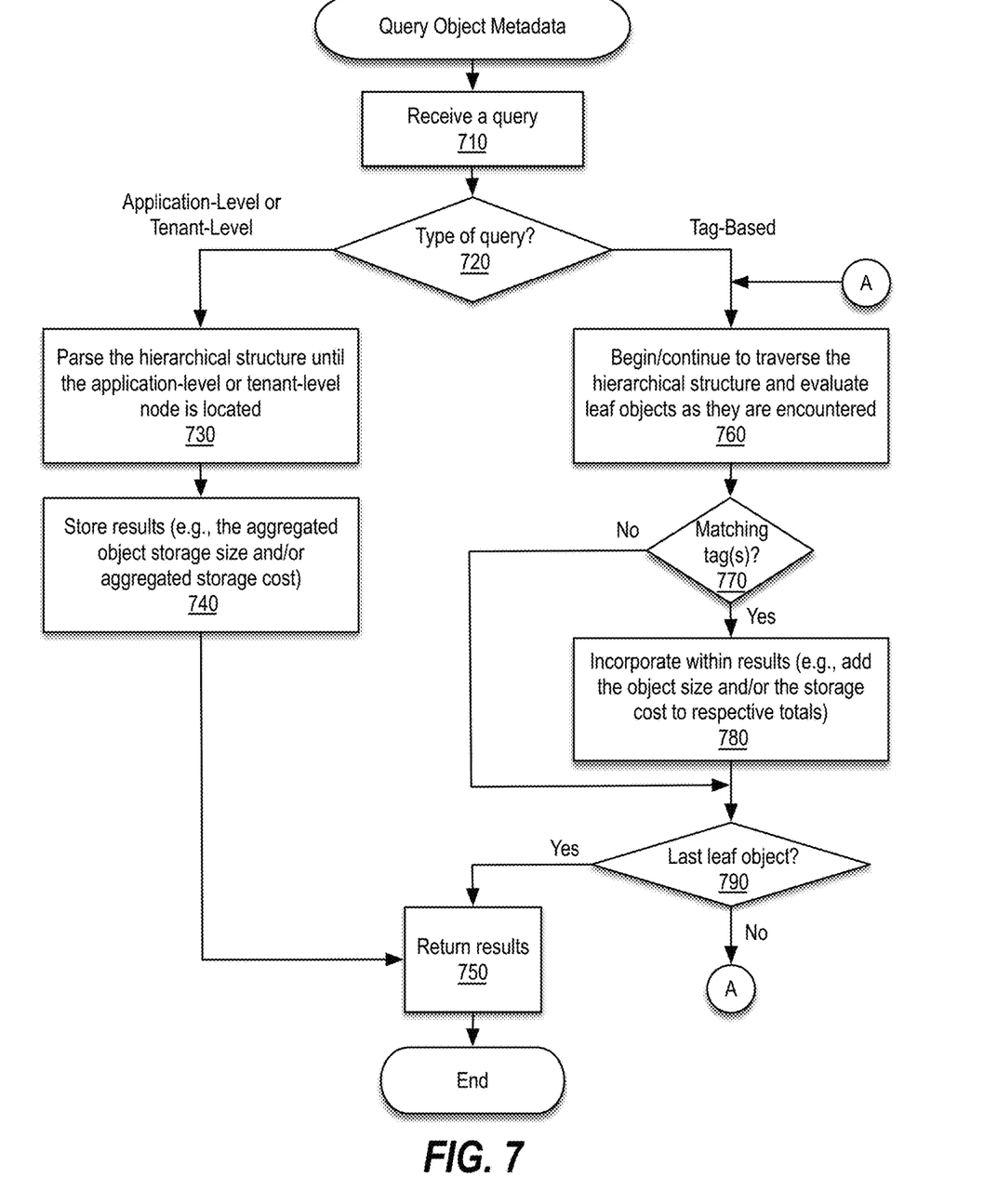
FIG. 7 is a flow diagram illustrating a set of operations for performing a query of object metadata in accordance with an embodiment of the present disclosure.

FIG. 7 is a flow diagram illustrating a set of operations for performing a query of object metadata in accordance with an embodiment of the present disclosure. The processing described with respect to FIG. 7 may be performed by an object cost/usage calculation mechanism (e.g., object cost/usage calculation mechanism 110). In one embodiment, the processing is performed by a query function (e.g., query function 230). For purposes of this example, it is assumed the object cost/usage calculation mechanism has previously persisted object metadata for objects stored in one or more object containers (e.g., target S3 bucket), for example, in the form of one or more timestamped JSON objects within a data store (e.g., data store 220). For example, a parser function (e.g., parser function 210) may be run periodically to hide the latency of the interactions with the one or more object containers via the object storage service APIs and thereby allow the query function to respond to queries more quickly. In one embodiment, based on the object metadata gathered and organized by the parser function, a total may be calculated for all objects matching a specified set of one or more criteria from meta properties, tags and/or the full object paths and return a storage cost total and/or a storage size (storage usage) total for all objects matching the specified criteria as described further below.

Depending on the particular implementation, the processing may be performed by processing logic that may comprise hardware (e.g., circuitry, dedicated logic, programmable logic, etc.), software (such as instructions run on a processing device), or a combination thereof. For brevity and clarity in presentation, the process is illustrated in linear sequences; however, it is contemplated that any number of the processing blocks can be performed in parallel, asynchronously, or in different orders. For brevity, clarity, and ease of understanding, many of the details discussed with reference to FIGS. 1-2 and 4-6 are not discussed or repeated here.

At block 710, a query is received. The query may specify, among other things, a set of one or more criteria based on the object metadata (e.g., metadata 250) (e.g., meta properties, tags and/or the full object path). The query may also include a date/time range over which storage costs and/or storage usage are to be calculated to facilitate selection of the appropriate JSON objects within a data store (e.g., data store 220).

At decision block 720, a determination is made regarding the type of query. If the query is an application-level or tenant-level query in which the criteria specify an application and/or a tenant (found within the full object path), the processing continues with block 730; otherwise, if the query includes tag-based criteria (e.g., specifies values for user-based tags), then processing branches to block 760.

At block 730, the hierarchical structure (e.g., JSON object 600), for example, retrieved from the data store may be parsed until the matching application-level and/or tenant-level node is located.

At block 740, the desired results (e.g., aggregated object storage size and/or the aggregated storage cost) may be extracted from the located node and stored.

At block 750, the results are returned to the originator of the query.

At bock 760, traversal of the hierarchical structure (e.g., JSON object 600), for example, retrieved from the data store may commence or continue depending on whether this is the first iteration of the loop represented by blocks 760-790 or a subsequent iteration. As the nodes of the hierarchical structure is traversed, appropriate metadata of the leaf objects (e.g., file objects—non-directory objects) may be evaluated as they are encountered.

At decision block 770, it is determined whether the leaf objects have user-based tags matching the criteria specified by the query. If so, processing continues with block 735; otherwise, processing branches to block 725 to.

At block 780, the desired metrics (e.g., object size and/or storage cost) are incorporated within running totals. For example, the object size and/or the storage cost of the leaf object at issue may be added to respective current running totals of object sizes and/or storage costs of leaf objects previously found to match the criteria.

At decision block 790, it is determined whether the JSON object traversal is complete (i.e., whether this is the last leaf object). If so, processing continues with block 750; otherwise, processing loops back to block 760 to continue traversal of the JSON object.

While for simplicity in the context of the present example, application-level and tenant-level queries are shown as being processed separately from tag-based queries, it is to be appreciated queries may include both types of criteria.

While in the context of various examples described herein, the result of a given query includes a total storage cost and/or a total storage usage for a group of files meeting the specified criteria, it is to be appreciated the results may include different metrics (e.g., object counts, access cost, etc.) in addition to or instead of total storage cost and/or total storage usage.

Figure 8:
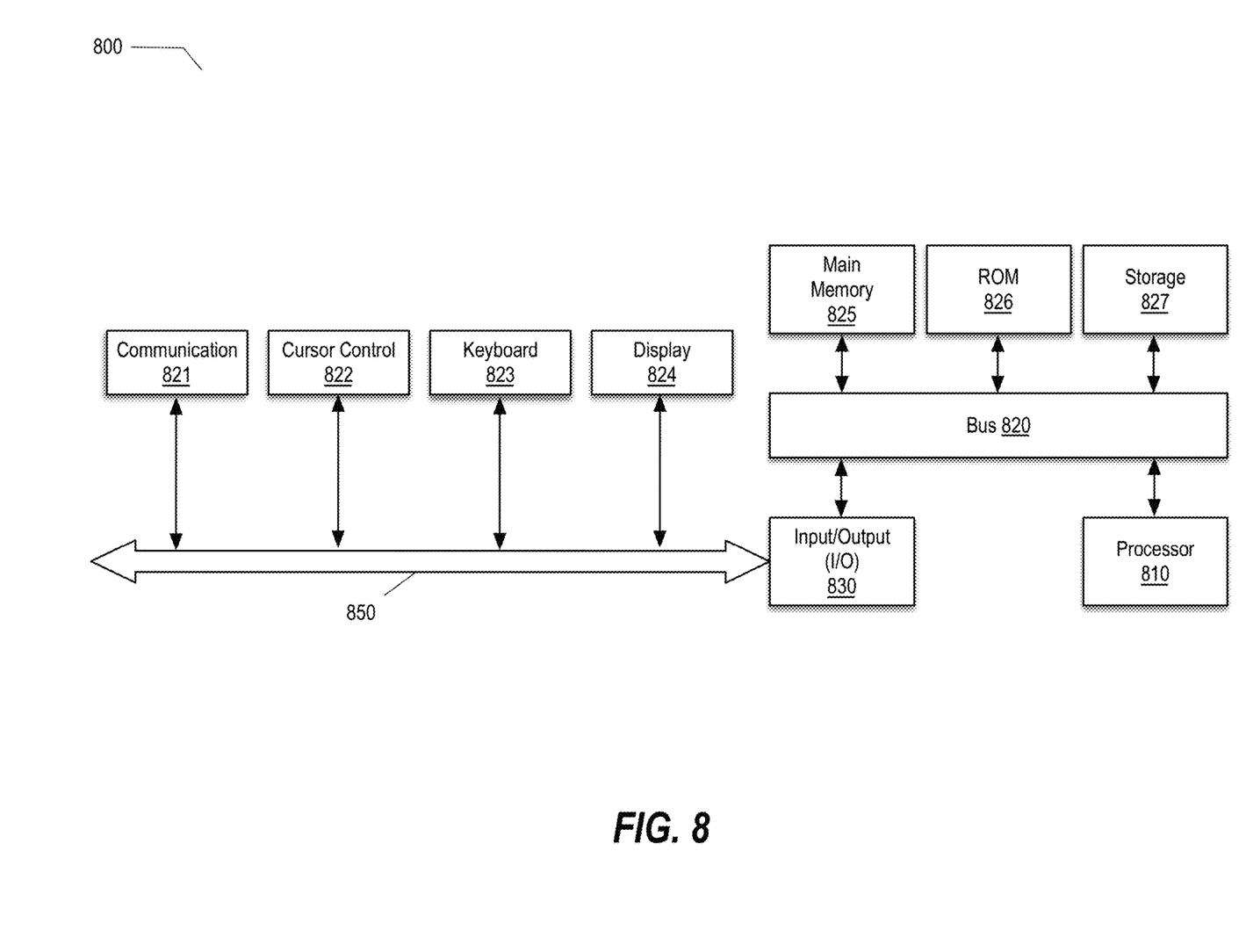
FIG. 8 is a block diagram illustrating a computing device suitable for implementing embodiments of the present disclosure.

FIG. 8 is a block diagram illustrating a computer system 800 on which computing device 120 and/or 121 may be implemented. Computer system 800 includes a system bus 820 for communicating information, and a processor 810 coupled to bus 820 for processing information.

Computer system 800 further comprises a random-access memory (RAM) or other dynamic storage device 825 (referred to herein as main memory), coupled to bus 820 for storing information and instructions to be executed by processor 810. Main memory 825 also may be used for storing temporary variables or other intermediate information during execution of instructions by processor 810. Computer system 800 also may include a read only memory (ROM) and or other static storage device 826 coupled to bus 820 for storing static information and instructions used by processor 810.

A data storage device 827 such as a magnetic disk or optical disc and its corresponding drive may also be coupled to computer system 800 for storing information and instructions. Computer system 800 can also be coupled to a second I/O bus 850 via an I/O interface 830. A plurality of I/O devices may be coupled to I/O bus 850, including a display device 824, an input device (e.g., a keyboard (or alphanumeric input device) 823 and or a cursor control device 822). The communication device 821 is for accessing other computers (servers or clients). The communication device 821 may comprise a modem, a network interface card, or other well-known interface device, such as those used for coupling to Ethernet, token ring, or other types of networks.

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes a method comprising: retrieving metadata regarding a subset of objects of a plurality of objects stored in one or more containers of an object storage service hosted by a cloud-based platform, wherein the subset of objects satisfy a set of one or more criteria and wherein the one or more containers are shared by one or more of (i) a plurality of customers of a Software-as-a-Service (SaaS) provider and (ii) a plurality of applications offered by the SaaS provider; and determining one or more of a total storage cost and a total size of the subset of objects by aggregating one or more of a storage cost and a size of each object of the subset of objects.

Example 2 includes the subject matter of Example 1, further comprising for each object of the subset of objects obtaining a plurality of meta properties associated with the object.

Example 3 includes the subject matter of Example 1 or 2, further comprising for each object of the subset of objects: determining a storage type associated with the object; and based on the storage type and the size of the object, calculating the storage cost for the object.

Example 4 includes the subject matter of any of Examples 1-3, wherein said retrieving is performed by a query function by accessing an intermediate data store that is populated by a parser function that collects metadata regarding the plurality of objects via an application programming interface (API) associated with the object storage service and runs in response to a manual directive or periodically based on a predetermined or configurable schedule.

Example 5 includes the subject matter of Example 4, wherein the metadata regarding the plurality of objects is returned by the API in a first data format and parsed into a second data format that is persisted to the intermediate data store.

Example 6 includes the subject matter of any of Examples 2-5, wherein the set of one or more criteria includes a tenant meta property of the plurality of meta properties corresponding to a specified customer or customers of the plurality of customers.

Example 7 includes the subject matter of any of Examples 2-6, wherein the set of one or more criteria includes an application meta property of the plurality of meta properties corresponding to a specified application or applications of the plurality of applications.

Example 8 includes the subject matter of any of Examples 2-7, wherein the set of one or more criteria includes a storage type meta property of the plurality of meta properties corresponding to a specified storage tier or storage tiers.

Example 9 includes the subject matter of any of Examples 2-8, wherein the set of one or more criteria includes a particular user-defined object tag corresponding to a specified value or values.

Some embodiments pertain to Example 10 that includes a method comprising: identifying one of more Amazon Web Services (AWS) S3 buckets containing data which has meta-tags associated with each object in the S3 bucket; using a webcrawler implementing a script to parse through the identified S3 buckets to determine which objects match a predetermined meta-tag. Determining cost characteristics associated with the objects. Determining the cumulative size of the objects matching the predetermined meta-tag. Determining a cost of storage for the objects matching the predetermined meta-tag as a function of their cumulative size.

Example 11 includes the subject matter of Examples 10, wherein the custom webcrawler examines Parquet files in the S3 buckets to perform one or more of said determining steps.

Example 12 includes the subject matter of Example 10 or 11, further comprising determining an access characteristic of the objects matching the predetermined meta-tag.

Example 13 include the subject matter of Example 12, wherein said determining an access cost is based on the access characteristics.

Example 14 includes an apparatus or a system that implements or performs a method of any of Examples 1-13.

Example 14 includes at least one machine-readable medium comprising a plurality of instructions, when executed on a computing device, implement or perform a method or realize an apparatus as described in any preceding Example.

Example 15 includes an apparatus or a system comprising means for performing a method as claimed in any of Examples 1-13.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A method comprising:
periodically collecting, by a parser function operable within a cloud-based platform utilized by a Software-as-a-Service (SaaS) provider, a first set of metadata regarding a plurality of objects stored in one or more containers of an object storage service hosted by the cloud-based platform, wherein the one or more containers are shared by one or more of (i) a plurality of customers of the SaaS provider and (ii) a plurality of applications offered by the SaaS provider;

storing, by the parser function, the first set of metadata within an intermediate data store;

retrieving, by a query function operable within the cloud-based platform, metadata regarding a subset of the plurality of objects from the intermediate data store, wherein the subset of the plurality of objects satisfy a set of one or more criteria; and determining one or more of a total storage cost and a total size of the subset of the plurality of objects by aggregating one or more of a storage cost and a size of each object of the subset of the plurality of objects.

2. The method of claim 1, further comprising, for each object of the subset of the plurality of objects, obtaining a plurality of meta properties associated with the object.

3. The method of claim 2, wherein the set of one or more criteria includes a tenant meta property of the plurality of meta properties corresponding to a specified customer or customers of the plurality of customers.

4. The method of claim 2, wherein the set of one or more criteria includes an application meta property of the plurality of meta properties corresponding to a specified application or applications of the plurality of applications.

5. The method of claim 2, wherein the set of one or more criteria includes a storage type meta property of the plurality of meta properties corresponding to a specified storage tier or storage tiers.

6. The method of claim 2, wherein the set of one or more criteria includes a particular user-defined object tag corresponding to a specified value or values.

7. The method of claim 1, further comprising for each object of the subset of the plurality of objects:
determining a storage type associated with the object; and
based on the storage type and the size of the object, calculating the storage cost for the object.

8. The method of claim 1, wherein said periodically collecting is performed via an application programming interface (API) associated with the object storage service based on a predetermined or configurable schedule.

9. The method of claim 8, wherein the first set of metadata regarding the plurality of objects is returned by the API in a first data format and parsed into a second data format that is persisted to the intermediate data store.

10. A non-transitory computer-readable medium having stored thereon instructions that, when executed by one or more processors, cause the one or more processors to:
periodically collect, by a parser function operable within a cloud-based platform utilized by a Software-as-a-Service (SaaS) provider, a first set of metadata regarding a plurality of objects stored in one or more containers of an object storage service hosted by the cloud-based platform, wherein the one or more containers are shared by one or more of (i) a plurality of customers of the SaaS provider and (ii) a plurality of applications offered by the SaaS provider;
store, by the parser function, the first set of metadata within an intermediate data store;
retrieve, by a query function operable within the cloud-based platform, metadata regarding a subset of the plurality of objects from the intermediate data store, wherein the subset of the plurality of objects satisfy a set of one or more criteria;
for each object of the subset of the plurality of objects, obtain one or more meta properties of a plurality of meta properties associated with the object; and
determine one or more of a total storage cost and a total size of the subset of the plurality of objects by aggregating one or more of a storage cost and a size of each object of the subset of the plurality of objects.

11. The non-transitory computer-readable medium of claim 10, wherein the instructions further cause the one or more processors to, for each object of the subset of the plurality of objects:
determine a storage type associated with the object; and
based on the storage type and the size of the object, calculate the storage cost for the object.

12. The non-transitory computer-readable medium of claim 10, wherein the first set of metadata is collected by the parser function via an application programming interface (API) associated with the object storage service and the parser function runs based on a predetermined or configurable schedule.

13. The non-transitory computer-readable medium of claim 12, wherein the first set of metadata regarding the plurality of objects is returned by the API in a first data format and parsed into a second data format that is persisted to the intermediate data store.

14. The non-transitory computer-readable medium of claim 10, wherein the object storage service comprises a Simple Storage Service (S3) compatible storage solution.

15. The non-transitory computer-readable medium of claim 10, wherein the set of one or more criteria includes one or more of:
a tenant meta property of the plurality of meta properties corresponding to a specified customer of the plurality of customers;
an application meta property of the plurality of meta properties corresponding to a specified application of the plurality of applications;
a storage type meta property of the plurality of meta properties corresponding to a specified storage tier; and
a particular user-defined object tag corresponding to a specified value.

16. A system comprising:
one or more processors; and
instructions, which when executed by the one or more processors cause the one or more processors to:
periodically collect, by a parser function operable within a cloud-based platform utilized by a Software-as-a-Service (SaaS) provider, a first set of metadata regarding a plurality of objects stored in one or more containers of an object storage service hosted by the cloud-based platform, wherein the one or more containers are shared by one or more of (i) a plurality of customers of the SaaS provider and (ii) a plurality of applications offered by the SaaS provider;
store, by the parser function, the first set of metadata within an intermediate data store;
retrieve, by a query function operable within the cloud-based platform, metadata regarding a subset of the plurality of objects from the intermediate data store, wherein the subset of the plurality of objects satisfy a set of one or more criteria;
for each object of the subset of the plurality of objects, obtain a plurality of meta properties associated with the object; and
determine one or more of a total storage cost and a total size of the subset of the plurality of objects by aggregating one or more of a storage cost and a size of each object of the subset of the plurality of objects.

17. The system of claim 16, wherein the instructions further cause the one or more processors to, for each object of the subset of the plurality of objects:
   determine a storage type associated with the object; and
   based on the storage type and the size of the object, calculate the storage cost for the object.

18. The system of claim 16, wherein the first set of metadata is collected by the parser function via an application programming interface (API) associated with the object storage service and the parser function runs based on a predetermined or configurable schedule.

19. The system of claim 18, wherein the first set of metadata regarding the plurality of objects is returned by the API in a first data format and parsed into a second data format that is persisted to the intermediate data store.

20. The system of claim 16, wherein the set of one or more criteria are represented in a form of a conditional expression involving one or more of:
   a tenant meta property of the plurality of meta properties;
   an application meta property of the plurality of meta properties;
   a storage type meta property of the plurality of meta properties; and
   a user-defined object tag of the plurality of meta properties.

* * * * *